US011718393B2

(12) United States Patent
Bellera et al.

(10) Patent No.: US 11,718,393 B2
(45) Date of Patent: Aug. 8, 2023

(54) METHOD AND A SYSTEM FOR PROVIDING A ROTORCRAFT WITH ASSISTANCE IN TAKING OFF

(71) Applicant: AIRBUS HELICOPTERS, Marignane (FR)

(72) Inventors: Jacques Bellera, Aix en Provence (FR); Nicolas Queiras, Les Pennes Mirabeau (FR)

(73) Assignee: AIRBUS HELICOPTERS, Marignane (FR)

( * ) Notice: Subject to any disclaimer, the term of this patent is extended or adjusted under 35 U.S.C. 154(b) by 503 days.

(21) Appl. No.: 17/097,463

(22) Filed: Nov. 13, 2020

(65) Prior Publication Data

US 2021/0171190 A1 Jun. 10, 2021

(30) Foreign Application Priority Data

Dec. 4, 2019 (FR) ...................................... 1913736

(51) Int. Cl.
*B64C 27/00* (2006.01)
*B64C 27/57* (2006.01)
(Continued)

(52) U.S. Cl.
CPC ................ *B64C 27/57* (2013.01); *B64C 9/00* (2013.01); *B64C 13/0421* (2018.01);
(Continued)

(58) Field of Classification Search
CPC ....... B64C 27/57; B64C 9/00; B64C 13/0421; B64C 25/36; B64C 25/52; B64C 27/06;
(Continued)

(56) References Cited

U.S. PATENT DOCUMENTS

| 4,574,360 A | 3/1986 | Bateman |
| 11,352,131 B2* | 6/2022 | Bosworth .............. B64U 70/80 |

(Continued)

FOREIGN PATENT DOCUMENTS

| FR | 2550626 A1 | 2/1985 |
| FR | 2986322 A | 8/2013 |

(Continued)

OTHER PUBLICATIONS

French Search Report for French Application No. FR1913736, Completed by the French Patent Office, dated Aug. 5, 2020, 11 pages.

*Primary Examiner* — Ian Jen
(74) *Attorney, Agent, or Firm* — Brooks Kushman P.C.

(57) ABSTRACT

A method and a system for providing a rotorcraft with assistance in taking off from a slope. The rotorcraft includes at least one lift rotor provided with a plurality of blades, control devices for controlling the pitches of the blades, and landing gear provided with at least three ground contact members. The method comprises a step of measuring a piece of information relating to the forces to which each ground contact member is subjected during a landing phase for landing on the slope, a step of measuring at least one piece of information relating to the pitches of the blades during the landing phase, and a control step for controlling the pitches of the blades during the takeoff phase during which the rotorcraft takes off after the landing as a function of the measurements taken during the landing in order to enable a takeoff to be performed that is safe and simplified.

27 Claims, 2 Drawing Sheets

(51) Int. Cl.
  *B64C 13/04* (2006.01)
  *B64C 9/00* (2006.01)
  *B64C 25/36* (2006.01)
  *B64C 25/52* (2006.01)
  *B64C 27/06* (2006.01)
  *B64C 27/08* (2023.01)
  *B64C 27/82* (2006.01)
  *G05D 1/08* (2006.01)

(52) U.S. Cl.
  CPC .............. *B64C 25/36* (2013.01); *B64C 25/52* (2013.01); *B64C 27/06* (2013.01); *B64C 27/08* (2013.01); *B64C 27/82* (2013.01); *G05D 1/0858* (2013.01)

(58) Field of Classification Search
  CPC ......... B64C 27/08; B64C 27/82; B64C 25/32; B64C 2025/325; G05D 1/0858; B64D 45/04
  See application file for complete search history.

(56) References Cited

U.S. PATENT DOCUMENTS

| | | | |
|---|---|---|---|
| 11,548,636 B2 * | 1/2023 | Dichter | ................... B64D 1/22 |
| 2013/0192903 A1 | 8/2013 | Dubois | |
| 2016/0327958 A1 | 11/2016 | Vallart et al. | |

FOREIGN PATENT DOCUMENTS

| | | |
|---|---|---|
| FR | 3035978 A1 | 11/2016 |
| WO | 2016048437 A1 | 3/2016 |

* cited by examiner

METHOD AND A SYSTEM FOR PROVIDING A ROTORCRAFT WITH ASSISTANCE IN TAKING OFF

CROSS-REFERENCE TO RELATED APPLICATIONS

This application claims priority to French patent application No. FR 19 13736 filed on Dec. 4, 2019, the disclosure of which is incorporated in its entirety by reference herein.

BACKGROUND OF THE INVENTION

(1) Field of the Invention

The present invention lies in the field of providing assistance in piloting rotorcraft.

The present invention relates to a method and a system for providing a rotorcraft with assistance in taking off, and to a rotorcraft equipped with such a system.

(2) Description of Related Art

A rotorcraft, also referred to as a "rotary-wing aircraft", conventionally has a fuselage and at least one lift rotor that is driven in rotation by a power plant and that provides, at least partially, the lift and possibly also the propulsion for the rotorcraft. The rotorcraft may also have an anti-torque device that opposes the yaw torque exerted by the main rotor on the fuselage of the rotorcraft and also makes it possible to control the yaw movements of the rotorcraft. An anti-torque device is sometimes constituted by an auxiliary rotor that is generally situated at the rear end of the rotorcraft, e.g. at the end of a tail boom of the rotorcraft, and that is driven in rotation by the power plant of the rotorcraft.

A rotorcraft may also have a plurality of lift rotors that simultaneously and at least partially provide the lift and possibly also the propulsion for the rotorcraft.

A rotorcraft may also have one or more propulsion propellers, e.g. placed on either side of the fuselage, and optionally on wings of the rotorcraft. The propellers are generally driven in rotation by the power plant of the rotorcraft and are suitable for also providing the anti-torque function and for controlling the yaw movements of the rotorcraft.

A rotorcraft may be piloted "locally", namely by a human pilot on board the rotorcraft. The rotorcraft may also be piloted remotely, namely by a pilot situated outside the rotorcraft, optionally at a very long distance away from the rotorcraft. The rotorcraft may also be piloted automatically, e.g. via an on-board computer.

Landing and takeoff of a rotorcraft on any terrain, and more particularly on unprepared or sloping terrain, constitute difficult maneuvers. Balance must continuously be found for the rotorcraft during these maneuvers by adjusting all of the controls of the rotorcraft, in pitching, in rolling, and in yawing, as the pitches of the blades of each lift rotor of the rotorcraft are varying.

Those maneuvers are even more difficult on sloping ground because any inappropriate control command can cause the rotorcraft to slip down the slope, or indeed cause it to turn over. Those maneuvers thus induce increased workloads for the pilot of the rotorcraft. In addition, usual assistance in piloting that is provided in such situations by piloting assistance systems, e.g. by an autopilot, remain limited or indeed non-existent.

Furthermore, at the start of landing, each lift rotor is positioned in a position that is quite close to the horizontal. As the landing phase progresses, and in particular, as the collective pitch of the blades of each lift rotor is progressively lowered, the rotorcraft starts to tilt down the slope, each lift rotor being maintained in a position that is still substantially horizontal in order to prevent the rotorcraft from dropping too quickly down the slope. This position of each lift rotor cannot be maintained until the end of landing. That is because that position induces forces and moments that are exerted on the mast of the rotor and that can cause damage to components of each lift rotor. Thus, at the end of the landing phase, once the collective pitch of the blades of each lift rotor has been lowered to a pitch stop or "full fine pitch" position, each lift rotor is repositioned manually by the pilot towards a centered position. The mean plane thus formed by the blades of each lift rotor is then situated perpendicular to the rotor mast of the rotorcraft, i.e. in a position substantially parallel to the slope.

The takeoff phase for taking off from sloping ground involves managing two aspects that are distinct but that can combine to make the maneuver more complex. Indeed, it is necessary firstly to control each lift rotor to make a vertical takeoff and secondly to avoid slipping down the slope during that phase. Before performing the takeoff maneuver, the settings of the pitches of the blades of each lift rotor must be adapted because each lift rotor being in a position parallel to the slope is not appropriate for making a takeoff that is purely vertical on a slope. Therefore, while progressively increasing the collective pitch of the blades of each lift rotor, the pilot must find a balance for the rotorcraft for takeoff by adjusting the cyclic pitch control for cyclically controlling the pitch of the blades of each lift rotor and, where applicable, the pitch control for controlling the pitch of the blades of an auxiliary rotor for controlling yaw movement, as a function of the behavior of the rotorcraft as perceived by the pilot, e.g. as a function of the accelerations and/or of the angular velocity of the rotorcraft, or indeed of external visual indications, such as the movements of the rotorcraft relative to the ground or indeed the variations in the positions of the plane of a rotor disk or "tip path plane".

Positioning each lift rotor is even more difficult in the absence of perception, depending on the type of controls used on the rotorcraft, it being possible for the pilot not to have feedback regarding the position and/or forces of each lift rotor through the collective pitch control stick, e.g. with fly-by-wire (FBW) controls, associated with a mini-stick, when the rotorcraft is being piloted remotely, or indeed when the takeoff phase is being performed in automated manner. Furthermore, the positioning of each lift rotor is also difficult to establish because it depends on numerous factors such as, for example, the gradient of the slope, the force and the direction of the wind, and the weight and the centering of the rotorcraft.

Most of the time, the usual systems for providing assistance in piloting a rotorcraft that are, for example, associated with an autopilot or with a fly-by-wire (FBW) system, cannot provide any assistance with positioning a lift rotor for a takeoff phase on a slope, given the many possible operational situations, and/or given that detection systems are used that are often limited to determining whether the rotorcraft is in flight or on the ground.

However, Document WO 2016/048437 is known that discloses a method of compensating for the position of a lift rotor of a rotorcraft, prior to takeoff, as a function of the attitude of the rotorcraft, and thus of the gradient of the ground on which the rotorcraft is standing. In that way, that method makes it possible to define a takeoff trajectory while taking into account any slope of the ground. That compensation method may also take into account the speed and the direction of the wind and/or the weight of the rotorcraft.

The technological background of the invention also includes Documents FR 3 035 978 and FR 2 550 626.

BRIEF SUMMARY OF THE INVENTION

An object of the present invention is to propose a method and a system for providing a rotorcraft with assistance in taking off that are applicable both on flat and horizontal ground and also on a slope, and that aim to overcome the above-mentioned limitations, by acting as of the start of the takeoff phase to position each rotor of the rotorcraft in an optimum position, and that are robust with respect to the different real operational conditions, mainly with respect to the gradient of ground on which the rotorcraft is standing, with respect to the wind in terms of amplitude and of direction, and with respect to the weight and to the centering of the rotorcraft. The present invention thus aims to make the takeoff maneuver easier and safer for the pilot of the rotorcraft.

The present invention provides a method of providing a rotorcraft with assistance in taking off, the rotorcraft including:

a fuselage;

at least one rotor provided with a plurality of blades and including at least one lift rotor;

control devices for controlling the pitches of the blades of said at least one rotor; and landing gear provided with at least three ground contact members.

For example, the rotorcraft may include a lift main rotor and optionally an auxiliary rotor for controlling yaw movement. The rotorcraft may also include a lift main rotor and at least one propulsion propeller that also provides a function of controlling yaw movement. The rotorcraft may also include a plurality of lift rotors and optionally one or more propulsion propellers.

The rotorcraft may be piloted by a human pilot who is on board or be piloted remotely by a human pilot some distance away. The rotorcraft may also be piloted automatically.

The rotorcraft may also include a computer in order to implement the method of providing a rotorcraft with assistance in taking off. For example, said computer may be integrated into an avionics system of the rotorcraft or else be dedicated to implementing the method of the invention.

The computer may comprise at least one processor and at least one memory, at least one calculator, at least one integrated circuit, and at least one programmable system or indeed at least one logic circuit, these examples not limiting the scope given to the expression "computer". The computer may be a computer dedicated to performing the method of the invention, or it may be a shared computer having multiple functions.

The method of the invention for providing assistance with taking off comprises the following steps:

measuring at least one piece of information relating to the forces to which each ground contact member is subjected during a landing phase;

measuring at least one piece of information relating to the pitches of the blades of each rotor during the landing phase during which the rotorcraft lands; and automatically controlling the pitches of the blades of each rotor during a takeoff phase during which the rotorcraft takes off after the landing as a function of the measurements taken during said landing.

The method of the invention for providing assistance in taking off is particularly adapted to a landing and takeoff phase on sloping ground, but naturally it may also be applied to a landing and takeoff phase on flat and horizontal ground.

The method of the invention thus makes it possible firstly to identify the settings of the pitches of the blades of each rotor of the rotorcraft that are used during the landing phase for landing on sloping ground or on flat ground, in particular at an opportune time at which the rotorcraft comes into contact with the ground, and then to position each rotor advantageously, using said settings as of the start of the takeoff phase.

The rotorcraft may include at least one lift rotor, the pitch of the blades of which is variable collectively and cyclically. Said at least one piece of information relating to the pitches of the blades of each rotor that is measured during the landing phase during which the rotorcraft lands then includes the collective pitch and the cyclic pitch of the blades of each lift rotor.

The rotorcraft may also include at least one auxiliary rotor that, in particular, controls the movements of the rotorcraft about the yaw axis, and the pitch of the blades of which is variable collectively only. Said at least one piece of information relating to the pitches of the blades of each rotor that is measured during the landing phase during which the rotorcraft lands then includes the collective pitch of the blades of each auxiliary rotor.

During the takeoff phase, the pilot preferably keeps control over adjusting the collective pitch of the blades of each lift rotor, and, de facto, controls the variation in said collective pitch of the blades of each lift rotor, the method advantageously, during the automatic control step for automatically controlling the pitches of the blades of each rotor, automatically controlling the cyclic pitch of the blades of each lift rotor that controls the movements of the rotorcraft about the pitch and roll axes of the rotorcraft, and possibly also about the yaw axis, and controlling the pitch of the blades of at least one possible auxiliary rotor that controls the movements of the rotorcraft about the yaw axis.

In the particular situation of landings on a slope, the rotorcraft is positioned firstly so that it is hovering before making a substantially vertical landing, and needs to take off again in the same configuration while taking into account the effect of the slope. This hypothesis is based on the fact that few usual operational conditions exist under which the rotorcraft taxis on the slope and possibly changes its heading.

The pieces of information about the pitches of the blades of each rotor of the rotorcraft, e.g. a lift main rotor and an auxiliary rotor for controlling the yaw movement, which pieces of information are obtained during the landing phase, can therefore be used during the takeoff phase for making a substantially vertical takeoff.

Said pieces of information about the pitches of the blades of each rotor of the rotorcraft that are obtained during the landing phase offer the advantage of being intrinsically robust to the gradient of the slope and to the wind conditions in terms of wind direction and of wind speed. The very large majority of landings and takeoffs on slopes, in particular on steep slopes, take place within a short lapse of time, with the rotors rotating. Under such conditions, it is legitimate to consider that the takeoff takes place under atmospheric conditions, namely wind, atmospheric pressure and temperature conditions that are substantially similar to those under which the landing takes place.

Similarly, the pieces of information about the pitches of the blades of each rotor of the rotorcraft that are obtained during the landing phase for landing on substantially flat and horizontal ground are also intrinsically robust with respect to the atmospheric conditions that are substantially similar to those under which the landing takes place for a takeoff made shortly after said landing and for the same heading.

However, if the rotorcraft moves on the ground after having landed on substantially flat and horizontal ground, it is preferable not to store the pieces of information about the pitches of the blades of each rotor of the rotorcraft that are obtained during the landing phase, but rather to use, for the takeoff phase, the pieces of information about the pitches of the blades of each rotor of the rotorcraft that correspond to the pieces of information obtained when hovering without any wind, with neutral centering, and with a mean weight.

In this way, each rotor is positioned automatically, as of the start of the takeoff phase, in a position that is optimized with respect to the slope of the ground on which the rotorcraft is situated. Therefore, the takeoff is facilitated for the pilot so that it is performed in balanced and substantially vertical manner, regardless of the gradient of the ground on which the rotorcraft is situated and without the pilot needing to seek such balance.

"Positioning a rotor" means, more specifically, positioning a "tip path plane", formed by the path of the free ends or "tips" of the blades while the rotor is rotating, in a desired position, the tip path plane moving, or indeed tilting, as a function of the variation in the pitches of the blades of said rotor. Variation in the collective pitches of the blades of a rotor causes the tip path plane to move in translation, said tip path plane keeping the same tilt relative to a reference, e.g. relative to a horizontal direction of the rotorcraft. A variation in the cyclic pitches of the blades of a rotor causes the tip path plane to tilt relative to said horizontal direction of the rotorcraft.

Furthermore, the rotorcraft may also include at least three lift rotors, the pitch of the blades of which is variable collectively only, their cyclic pitch being fixed, and it being possible for such a rotorcraft to be referred to as a "multi-rotor rotorcraft". The movements of the rotorcraft are then controlled by controls that are different from those of a helicopter, such as, for example, differential variations in the collective pitches of the blades of the lift rotors and/or speeds of rotation of the lift rotors, or indeed orientation of control surfaces arranged in the airflow sweeping over at least one lift rotor. However, the control principle of the present invention remains applicable by reasoning in terms of the four control axes of the rotorcraft, namely the pitch, roll, yaw, and lift axes.

In this situation, said at least one piece of information relating to the pitches of the blades of each rotor that is measured during the landing phase during which the rotorcraft lands includes the collective pitch of the blades of each lift rotor and/or the speed of rotation of each lift rotor and/or the orientation of control surfaces arranged in the airflow sweeping over at least one lift rotor. During the automatic control of the pitches of the blades of each lift rotor, the collective pitch of the blades of each lift rotor and/or the speed of rotation of each lift rotor and/or the orientation of said control surfaces may be controlled automatically in parallel with control by a human pilot or an autopilot of the multi-rotor rotorcraft that is aimed at modifying the collective pitch of the blades of each lift rotor and/or the speed of rotation of each lift rotor identically.

The present invention is optimized regardless of the type of landing gear of the rotorcraft, e.g. wheeled, ski, or skid landing gear.

For example, when the landing gear is wheeled, the landing gear may comprise at least three wheeled undercarriage units, each undercarriage unit being provided with a ground contact member comprising at least one wheel and at least one connecting member that connects said at least one wheel to the fuselage of the rotorcraft. Thus, the landing gear comprises at least three ground contact members, each of which comprises at least one wheel.

Similarly, when the landing gear has skis, the landing gear may comprise three ski undercarriage units, each undercarriage unit being provided with a ground contact member comprising at least one ski and at least one connecting member connecting at least one ski to the fuselage of the rotorcraft. Thus, the landing gear comprises at least three ground contact members, each of which comprises at least one ski.

When the landing gear has skids, the landing gear may comprise two undercarriage units, each of which is provided with a skid, each undercarriage unit being provided with two ground contact members, each of which comprises a portion of a skid and a connecting member connecting the skid to the fuselage of the rotorcraft. When the landing gear comprises two skid undercarriage units, the landing gear comprises four ground contact members. Two connecting members, each of which connects a respective skid to the fuselage may, for example, be formed by a single common component, such as a cross-member fastened to the fuselage and to the two skids.

The method of the invention for providing assistance in taking off may further have one or more of the following characteristics, taken individually or in combination.

In one aspect, the step of measuring at least one piece of information relating to the pitches of the blades of each rotor may comprise measuring the positions of at least one pitch control device for controlling pitch of the blades of each rotor of the rotorcraft, e.g. by means of a sensor positioned on each pitch control device. For example, the position of a control lever for controlling the cyclic pitch of the blades of a lift main rotor may be measured, the position of the control lever for controlling the cyclic pitch corresponding to the commands about the pitch and roll axes of the rotorcraft. It is also possible to measure the position of control pedals for controlling the collective pitch of the blades of an auxiliary rotor, this position of the pedals corresponding to a command about the yaw axis of the rotorcraft. A measurement of the position of a control stick for controlling the collective pitch of the blades of said lift main rotor may optionally also be stored.

The step of measuring at least one piece of information relating to the pitches of the blades of each rotor may also comprise a direct measurement of the pitches of the blades of each rotor at each rotor, e.g. by means of a sensor positioned at a swashplate of each rotor, at each servocontrol controlling the pitch of the blades of each rotor or indeed at at least one blade of each rotor.

This measurement of at least one piece of information relating to the pitches of the blades of each rotor is performed during the landing phase, and in particular when the rotorcraft comes into contact with the ground and/or when the reaction forces from the ground on the rotorcraft increase. In the particular situation of landing on sloping ground, the rotorcraft is positioned firstly hovering above the ground before making a substantially vertical landing. Contrary to landing on ground that is substantially horizontal, the various different ground contact members of the landing gear come into contact with the ground in desynchronized manner. For example, for a rotorcraft provided with landing gear comprising three wheeled undercarriage units, a first undercarriage unit comes into contact with the ground, and then, with the rotorcraft continuing its descent, the other two undercarriage units can come into contact with the ground simultaneously or indeed one after the other.

The measurement step for measuring at least one piece of information relating to the forces to which each ground contact member of the landing gear is subjected makes it possible firstly to detect a ground contact member coming into contact with the flat or sloping ground and secondly to detect an increase in a reaction force from the ground on said ground contact member.

In another aspect, the step of measuring at least one piece of information relating to the forces exerted on each ground contact member of the landing gear during the landing phase may comprise directly measuring a force to which each ground contact member is subjected by means of a sensor arranged in or on said ground contact member.

The step of measuring at least one piece of information relating to the forces exerted on each ground contact member of the landing gear during the landing phase may also comprise measuring penetration or deformation of each ground contact member. Then, the computer uses a correlation table that gives correlations between firstly the force to which the ground contact member is subjected and secondly the measured penetration or deformation of each ground contact member in order to deduce the force to which the ground contact member is subjected from the measured penetration or deformation of each ground contact member. Said correlation table may be determined previously and is specific to each rotorcraft, and is also a function of the payload on board. For example, this correlation table may be stored in a memory of the computer or else in a memory connected to the computer.

For example, movement or deformation of a component or of a region of the ground contact member is measured by means of a sensor arranged in said ground contact member. Document FR 2 986 322 describes a measurement device comprising a sensor arranged in a ground contact member of an undercarriage unit and measuring deformation of a region of said ground contact member. A force to which the ground contact member is subjected is associated with each measured value of the deformation of said ground contact member. In this way, said device makes it possible to obtain progressive and continuous values for the forces and stresses to which the undercarriage unit is subjected, and therefore the stresses that the ground exerts on the rotorcraft via each ground contact member at the time of landing or of takeoff.

In another aspect, the method may further comprise a step of storing said at least one piece of information, as measured, relating to the pitches of the blades of each rotor, and optionally of also storing a piece of information, as measured, relating to the forces to which each ground contact member of the landing gear is subjected. This storing is performed in a memory of the computer or indeed in an independent memory connected to the computer. Furthermore, in the situation when a piece of information relating to the forces to which each ground contact member is subjected is a penetration or a deformation, the force corresponding to said piece of information may also be stored.

These combined pieces of information relating to pitch values of the blades of each rotor and to forces to which each ground contact member is subjected may then make it possible to reconstruct the behavior of the rotorcraft, during the landing phases during which it lands on flat or sloping ground, in particular the balance conditions for each rotor and for the rotorcraft as a whole.

The method of the invention advantageously makes it possible, during the automatic control step for automatically controlling the pitches of the blades of at least one rotor, to retrieve the measurements of said at least one piece of information relating to the pitches of the blades of each rotor as taken during the landing phase and to use said measurements during the takeoff phase, so as to enable each rotor of the rotorcraft to be positioned automatically relative to the gradient of the ground so as to obtain the balance conditions for each rotor and for the rotorcraft as a whole. The pilot then does not have to seek those balance conditions, thereby facilitating the takeoff maneuver and drastically reducing the workload on the pilot.

These control positions for controlling the pitch of the blades of each rotor as obtained during the landing phase offer the advantage of being intrinsically robust at least with respect to the gradient of the ground on which the rotorcraft is standing, or indeed with respect to the wind conditions. Indeed, a rotorcraft generally stands for a short time only on sloping ground, in particular for steep slopes, and takeoff follows landing closely, or even without stopping the rotation of the rotors. Therefore, the conditions encountered on taking off from sloping ground, in particular the wind conditions, namely the direction and the speed of the wind, as well as the temperature and the atmospheric pressure, are very close to, or indeed similar to, the conditions that prevailed during the landing. Therefore, it is legitimate to consider that the rotorcraft takes off under conditions similar to those of the landing, the positioning of each rotor on the basis of settings identical to those of the landing enabling the rotorcraft to take off safely.

This automatic control step for automatically controlling the pitches of the blades of each rotor is performed by means of the computer delivering, for example, pitch setpoints corresponding to the measurements of said at least one piece of information relating to the pitches of the blades of at least one rotor that are taken during the landing phase. For example, the computer transmits digital or analog signals, in electrical or optical form, carrying said setpoints for use by an autopilot of the rotorcraft, or else directly carrying fly-by-wire commands associated respectively with each rotor.

The method of the invention thus makes it possible firstly to ensure that each rotor is positioned properly for making a vertical takeoff from sloping ground, and secondly to avoid slipping down the slope during the takeoff phase. Without this method, the pilot of the rotorcraft must, before making the takeoff proper, control each rotor in order to find a balance making it possible to takeoff substantially vertically.

In an aspect, the automatic control step for automatically controlling the pitches of the blades of each rotor during a takeoff phase during which the rotorcraft takes off may be performed as soon as the start of the takeoff phase during which the rotorcraft takes off is detected in order to position the blades of each rotor using the measurements taken during the landing phase as early as possible and automatically.

The start of the takeoff phase may be detected as soon as action is taken that aims to increase or that increases the collective pitch of the blades of each lift rotor. For example, as soon as the pilot of the rotorcraft acts on the control stick for controlling the collective pitch of the blades of a lift main rotor, the start of the takeoff phase may be detected and the automatic control step for automatically controlling the pitches of the blades of each rotor for a takeoff phase during which the rotorcraft takes off is performed.

The start of the takeoff phase may also be detected as soon as a piece of information relating to the collective pitch of the blades of at least one lift rotor is greater than a takeoff threshold. Such a piece of information may be obtained by means of at least one sensor that is also used for the measurement step for measuring at least one piece of information relating to the pitches of the blades of each rotor during the landing phase during which the rotorcraft lands. For example, the takeoff threshold is equal to 20% of the amplitude of variation in the collective pitch of the blades of said lift rotor.

In this way, a takeoff threshold may be compared with a pitch value or with a position of a pitch control device.

In one aspect, the measurement step for measuring said at least one piece of information relating to the pitches of the blades of each rotor may be performed continuously during the landing phase and in parallel with the measurements of said at least one piece of information relating to the forces to which each ground contact member is subjected, each measurement of said piece of information relating to the pitches of the blades of each rotor being associated with measurements of said at least one piece of information relating to the forces to which each ground contact member is subjected.

This measurement step may also be performed by sampling the measurements at regular intervals using usual techniques.

In both of these situations, the storage step stores successive measurements of said at least one piece of information relating to the pitches of the blades of each rotor that are taken during the landing phase.

In another aspect, the step of measuring said at least one piece of information relating to the pitches of the blades of each rotor may be performed at an opportune time of the landing phase corresponding to a particular contact phase in which the rotorcraft comes into contact with the ground. In this situation, the storage step stores the successive measurements of said at least one piece of information relating to the pitches of the blades of the rotors that are taken at this opportune time of the landing phase.

For example, a particular contact phase in which the rotorcraft comes into contact with the ground is reached when a single ground contact member is in contact with the ground and when a significant increase in a force on said ground contact member in contact with the ground is detected.

Such a particular contact phase in which the rotorcraft comes into contact with the ground may be considered to have been reached when a piece of information relating to the forces to which a ground contact member in contact with the ground is subjected is greater than a penetration threshold, and when pieces of information relating to the forces to which the other ground contact members are subjected are less than a non-contact threshold, the non-contact threshold being less than the penetration threshold.

A particular contact phase in which the rotorcraft comes into contact with the ground may also be reached when two ground contact members are detected as being in contact with the ground. Such a particular contact phase in which the rotorcraft comes into contact with the ground may be considered to have been reached when pieces of information relating to the forces to which two ground contact members in contact with the ground are subjected are greater than a contact threshold, and each piece of information relating to the forces to which each of the other ground contact members is subjected is less than a non-contact threshold, the non-contact threshold being less than the contact threshold.

The penetration, contact, and non-contact thresholds are a function of the weight of the rotorcraft, of the distribution of said weight and of the type of landing gear, namely wheeled, ski, or skid landing gear. The penetration threshold may also be different for undercarriage units of the same landing gear.

For example, the penetration, contact, and non-contact thresholds may correspond to forces when said at least one piece of information relating to the forces to which each of the ground contact members are subjected is directly a force or makes it possible to deduce a force. The penetration, contact, and non-contact thresholds may also be distance values when said at least one piece of information relating to the forces to which each of the other ground contact members is subjected is a penetration or a deformation.

For a rotorcraft including landing gear provided with three wheeled undercarriage units, the penetration threshold is, for example, equal to 25,000 newtons for a main wheeled undercarriage unit arranged at the rear of the rotorcraft and 15,000 newtons for an auxiliary wheeled undercarriage unit arranged at the front of the rotorcraft. For example, the contact threshold may be equal to 2500 newtons and the non-contact threshold may be equal to 1000 newtons regardless of the wheeled undercarriage unit.

In another aspect, when the step of measuring said at least one piece of information relating to the pitches of the blades of each rotor is performed continuously or in sampled manner during the landing phase, the computer may, a posteriori, and based on the measurements of said at least one piece of information relating to the forces to which each ground contact member of the landing gear is subjected, determine the opportune time of the landing phase that corresponds to a particular contact phase in which the rotorcraft comes into contact with the ground as described above. Therefore, the control step for controlling the pitch of the blades of the rotors for a takeoff phase during which the rotorcraft takes off uses measurements of the piece of information relating to the pitches of the blades of the rotors, which measurements are associated with the opportune time of the landing phase.

In another aspect, during the landing phase, a piloting assistance law for automatic stabilization and for providing assistance in piloting the rotorcraft may be used. This piloting assistance law for automatic stabilization may act on the pitch of the blades of each rotor of the rotorcraft in addition to the commands from a pilot. The commands of this piloting assistance law for automatic stabilization are made up mainly of a "dynamic" portion and of a "static" portion. In this situation, only the "static" portion of the piece of information relating to the pitches of the blades of the rotors is stored, the "dynamic" portion corresponding to the contribution from the piloting assistance law for automatic stabilization to the pitches of the blades of each rotor not being taken into account.

If the information relating to the pitches of the blades of the rotors is a measurement of the positions of at least one control device for controlling the pitches of the blades of each rotor of the rotorcraft, said "dynamic" portion related to the contribution from the automatic stabilization is not taken into account.

If the piece of information relating to the pitches of the blades of the rotors is a direct measurement of the pitches of the blades at each rotor, said "dynamic" portion is subtracted from said measurement for each rotor. Furthermore, when the pitches of the blades of the rotors are controlled automatically, the piece of information relating to the pitches of the blades of the rotors may also be equal to the total setpoint from the autopilot minus the "dynamic" portion related to the contribution for the stabilization from the autopilot.

In another aspect, when the pilot lowers the control stick for controlling the collective pitch of each lift main rotor towards the "full fine pitch" position in order to finish the landing phase, a recentering phase for recentering the pitches of the blades of each rotor that is performed as soon as the piece of information relating to the collective pitch of said blades of each lift rotor is less than a recentering threshold and as soon as the entire set of landing gear of the rotorcraft is sufficiently loaded, e.g. when the piece of information relating to the forces to which each ground contact member is subjected is greater than an actual landing threshold representing the fact that the rotorcraft is on the ground.

For example, the recentering threshold may be equal to a value of 30% of the amplitude of variation in the collective pitch of the blades of each lift rotor and the actual landing threshold may be equal to 40,000 newtons. This recentering phase for recentering the pitches of the blades of each rotor makes it possible to position each lift rotor perpendicularly to the respective mast of each rotor and to position any auxiliary rotor about a centered position. Such a centered position of each rotor is usually referred to by the person skilled in the art as the "zero pitch" position. This recentering phase for recentering the pitches of the blades of the rotors is applicable regardless of whether the rotorcraft lands on flat and horizontal ground or on a slope.

Furthermore, in order to adapt to the various possible takeoff dynamics implemented by a pilot by means of the collective pitch control stick, a calibrated dynamic for reaching the positions of the pitches of the blades corresponding to the pieces of information relating to the pitches of the blades of each rotor as stored is adapted as a function of the control dynamic observed on the collective pitch control stick so as to reach said positions of the pitches of the blades appropriately and consistently with this control dynamic observed on the collective pitch control stick.

In another aspect, in order to be robust to stresses from the pilot on the collective control stick during the landing, the piece of information relating to the pitches of the blades of each rotor as measured during the landing phase during which the rotorcraft lands are stored until it is detected that the rotorcraft is taking off again, e.g. until the pieces of information relating to the forces to which each ground contact member is subjected are less than the non-contact threshold.

The method of the invention may advantageously take into account a plurality of operational conditions while the rotorcraft is landing and/or taking off.

For example, during landing, if the piece of information relating to the collective pitch of the blades of each lift rotor is measured as being less than the recentering threshold, with the recentering phase for recentering the pitches of the blades of each rotor towards the "zero pitch" position having been performed, and then if each piece of information relating to the collective pitch of the blades of each lift rotor increases without having been less than the takeoff threshold, the automatic control step for automatically controlling the pitches of the blades of each rotor is performed as it is for a takeoff as soon as the piece of information relating to the collective pitch of the blades of each lift rotor is measured as being greater than a specific threshold, e.g. equal to 35% of the amplitude of variation in said collective pitch. In this situation, the landing is not considered to be finished, and the automatic control step for automatically controlling the pitches of the blades of each rotor is performed in order to prepare the rotorcraft for a possible takeoff.

At the time this recentering phase is applied during landing, the actions from the pilot on the pitch controls of the rotorcraft are subtracted from the centered position of each rotor corresponding to the "zero pitch" position so that the rotors are positioned in this "zero pitch" position. Any setpoints from a piloting assistance control law providing stability for the rotorcraft are added to this "zero pitch" position.

However, after the time at which this recentering phase is applied, any actions taken by the pilot on the pitch controls of the rotorcraft are added to the "zero pitch" position. Similarly, setpoints from a control law providing stability for the rotorcraft that are applied after that time are also added to this "zero pitch" position.

Furthermore, before this recentering phase, only the actions of the pilot are applied to the rotors, to which actions any setpoints from a control law providing stability for the rotorcraft are added.

In another example, during a takeoff, if the piece of information relating to the collective pitch of the blades of each lift rotor is measured as being greater than a takeoff threshold, and then is reduced without having been greater than a recentering threshold greater than the takeoff threshold, the phase of recentering the rotors towards the "zero pitch" position is performed when the piece of information relating to the collective pitch of the blades of each lift rotor is measured as being less than a limit threshold, e.g. equal to 15% of the amplitude of variation in the collective pitch.

In another aspect, if a taxiing operation has been performed after a landing, e.g. on a shallow slope with a gradient less than or equal to 3°, with a piece of information relating to the collective pitch of the blades of each lift rotor being less than the takeoff threshold, storage of the pieces of information relating to the pitches of the blades of each rotor is inhibited. During a takeoff, the automatic control step for automatically controlling the pitches of the blades of each rotor during the takeoff phase is then performed towards a predetermined position of the blades of each rotor by replacing the measurements taken during said landing, this predetermined position of the blades of each rotor corresponding to the rotorcraft being balanced when hovering, without any wind, and with the rotorcraft having a predetermined mean weight, with a predetermined centering of the weights, e.g. neutral centering of the weights.

Furthermore, so as not to disturb the taxiing phases during which the rotorcraft taxis, also, for example, on a shallow slope less than or equal to 3°, the automatic control step for automatically controlling the pitches of the blades of each rotor during the takeoff phase is then performed when the piece of information relating to the collective pitch of the blades of each lift rotor is greater than a specific threshold greater than the takeoff threshold. For example, the specific threshold may be equal to 35% of the amplitude of variation in the collective pitch of the blades of each lift rotor.

In another aspect, the automatic control step for automatically controlling the pitches of the blades of each rotor during a takeoff phase during which the rotorcraft takes off may constitute the full command from the control law of the rotorcraft. The automatic control step advantageously makes it possible to achieve a considerable reduction in the contribution from the pilot during this takeoff phase that is particularly difficult and that generates a very large workload.

In another aspect, the recentering phase for recentering the pitches of the blades of each rotor towards the "zero pitch" position during a landing phase during which the rotorcraft lands may constitute the full command of the control law of the rotorcraft. The recentering phase advantageously makes it possible to achieve a considerable reduction in the contribution from the pilot in said landing phase.

However, any actions taken by the pilot on the pitch controls of the rotorcraft after the time at which the control step is applied are added to said full command of the automatic control step. Similarly, setpoints from a control law providing stability for the rotorcraft during the takeoff phase and that are applied after the time at which the control step is applied are added to said full command of the automatic control step.

In another example, in the particular situation in which the pilot acts on the control lever for controlling the cyclic pitch of the blades of each lift rotor and/or on the pedals for controlling the pitch of the blades of an auxiliary rotor at the time at which the automatic control step for automatically controlling the pitches of the blades of each rotor takes place during the takeoff phase, the actions of the pilot are subtracted from said full command of the automatic control step so that the rotors are positioned using the full command of the automatic control step. For example, if the pilot manually positions the controls at the values of the full command of the automatic control step, there is then no variation in the control of the pitches of the blades of each rotor during the automatic control step for automatically controlling the pitches of the blades of each rotor. Conversely, setpoints from a control law providing stability for the rotorcraft during the takeoff phase and that are applied at the time at which the control step is applied are added to said full command of the automatic control step.

Furthermore, before application of the automatic control step for automatically controlling the pitches of the blades of each rotor, only the actions of the pilot are applied to the rotors, to which actions any setpoints from a control law providing stability for the rotorcraft are added.

In another aspect, the method may further comprise an automatic takeoff step performed by applying an increasing setpoint to the collective pitch of the blades of each lift rotor of the rotorcraft, the automatic control step for automatically controlling the pitches of the blades of each rotor being performed simultaneously as described above.

In another aspect, when the measurement step for measuring said at least one piece of information relating to the pitches of the blades of each rotor is performed continuously or in sampled manner during the landing phase, an automatic takeoff step may be performed by applying an increasing setpoint to the collective pitch of the blades of each lift rotor of the rotorcraft, during the automatic takeoff, the automatic control step for automatically controlling the pitches of the blades of each rotor, applying, successively and in reverse order, automatic commands for controlling the pitches of each rotor using the measurements of the pitches of the blades of each rotor that are taken during the landing phase.

The present invention further provides a system for providing a rotorcraft with assistance in taking off, the rotorcraft including:
  a fuselage;
  at least one rotor provided with a plurality of blades and including at least one lift rotor;
  control devices for controlling the pitches of the blades of each rotor; and
  landing gear provided with at least three ground contact members connected to the fuselage.

The system for providing a rotorcraft with assistance in taking off comprises:
  at least one computer;
  at least one measurement device for measuring at least one piece of information relating to the forces to which each ground contact member of the landing gear is subjected; and
  at least one measurement device for measuring at least one piece of information relating to the pitches of the blades of at least one rotor.

The system for providing assistance in taking off is configured to implement the method of providing assistance in taking off as described above.

Finally, the present invention provides a rotorcraft including:
  a fuselage;
  at least one rotor provided with a plurality of blades and including at least one lift rotor;
  control devices for controlling the pitches of the blades of each rotor;
  landing gear provided with at least three ground contact members; and
  a system for providing a rotorcraft with assistance in taking off as described above.

BRIEF DESCRIPTION OF THE DRAWINGS

The invention and its advantages appear in greater detail from the following description of examples given by way of illustration with reference to the accompanying figures, in which.

BRIEF DESCRIPTION OF THE INVENTION

Elements present in more than one of the figures are given the same references in each of them.

Figure 1:
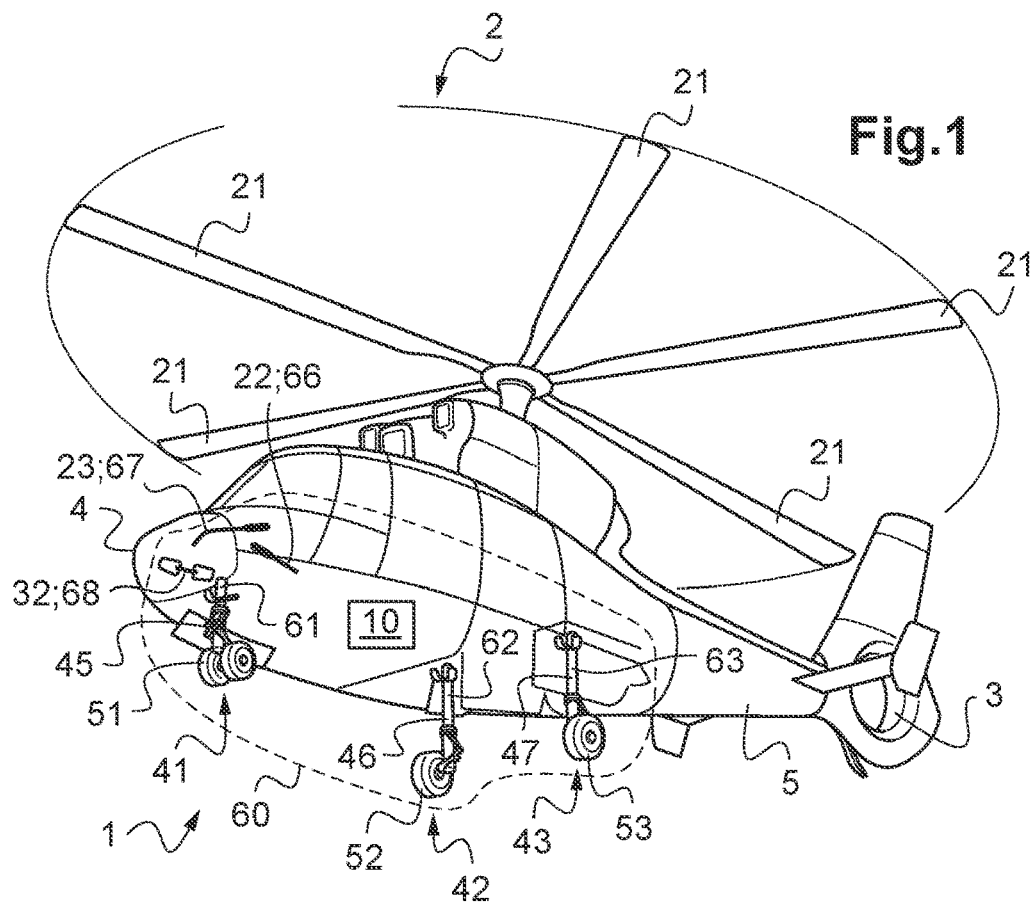
FIG. 1 shows a rotorcraft provided with wheeled landing gear.
Figure 2:
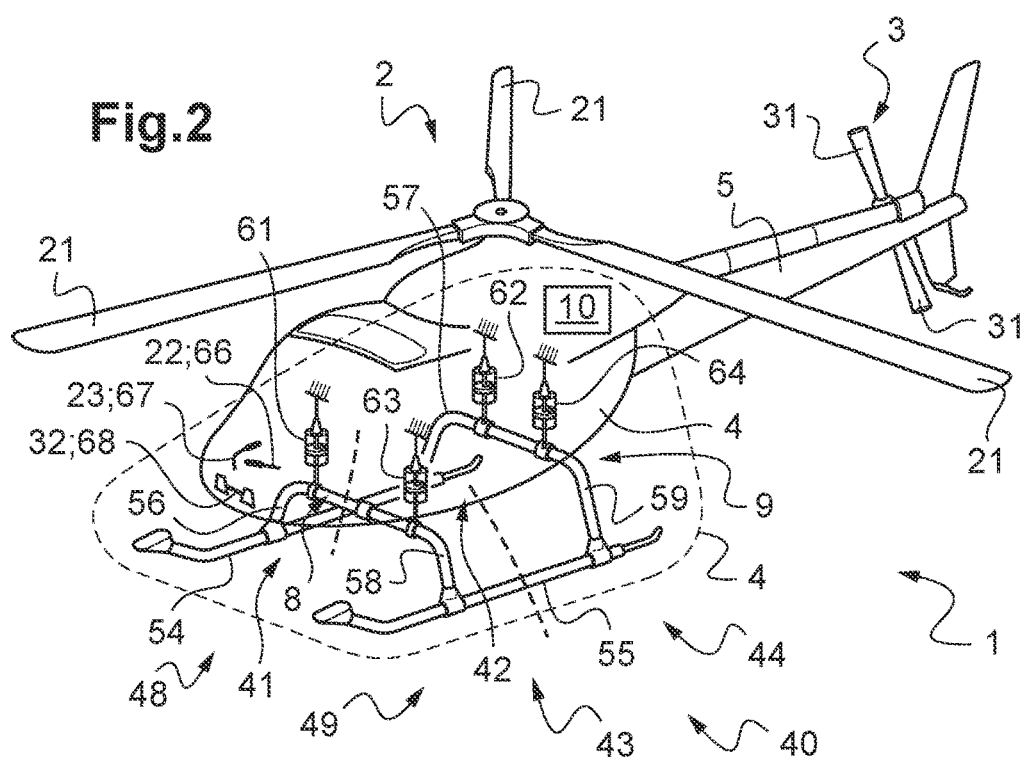
FIG. 2 shows a rotorcraft provided with skid landing gear.

FIGS. 1 and 2 show a rotorcraft 1 having a fuselage 4, at least one rotor 2, 3 provided with a plurality of blades 21, 31, control devices 22, 23, 32 for controlling the pitches of the blades 21, 31 of each rotor 2, 3, landing gear 40 provided with at least three ground contact members 41, 42, 43, 44, and a system 60 for providing a rotorcraft 1 with assistance in taking off. The system 60 for providing a rotorcraft 1 with assistance in taking off makes it possible to assist a pilot during a takeoff both on flat and horizontal ground and also on a slope.

More precisely the rotorcraft 1 has a lift main rotor 2 arranged above the fuselage 4 and an anti-torque and yaw movement control tail auxiliary rotor 3 arranged at the end of a tail boom 5 connected to the fuselage 4. The lift main rotor 2 has a plurality of blades 21, the pitches of which can be modified collectively via a collective pitch control stick 22 and cyclically via a cyclic pitch control lever 23. The tail auxiliary rotor 3 has a plurality of blades 31, the pitch of which can be modified collectively via pedals 32.

The rotorcraft 1 shown in FIG. 1 has landing gear 40 provided with three wheeled undercarriage units. Each wheeled undercarriage unit has a ground contact member 41, 42, 43 provided with at least one wheel 51, 52, 53, and with a connecting member 45, 46, 47 connecting said at least one wheel 51, 52, 53 to the fuselage 4 of the rotorcraft 1. The undercarriage unit 41 is situated at the front of the rotorcraft 1, has two wheels 51, and constitutes an auxiliary undercarriage unit. The undercarriage units 42, 43 are situated at the rear of the rotorcraft 1, each of them has a single wheel 51, 53, and they constitute main undercarriage units.

Each wheel 51, 52, 53 of the wheeled landing gear 40 may be replaced with or accompanied by a ski in order to form ski landing gear.

The rotorcraft 1 shown in FIG. 2 has landing gear 40 provided with two skid undercarriage units 48, 49, each of which is provided with two ground contact members 41, 42, 43, 44. Each ground contact member 41, 42, 43, 44 comprises a portion of a skid 54, 55 and a connecting member 56, 57, 58, 59 connecting the skid 54, 55 to the fuselage 4. Thus, two connecting members 56, 57 connect a first skid 54 to the fuselage 4 and two other connecting members 58, 59 connect a second skid 55 to the fuselage 4. For example, two cross-members 8, 9 simultaneously connecting both of the two skids 54, 55 to the fuselage 4 may each be formed by two connecting members 56, 57, 58, 59, each of which is connected to a respective one of the two skids 54, 55.

The system 60 for providing a rotorcraft 1 with assistance in taking off includes a computer 10, at least one measurement device 61 64 for measuring at least one piece of information relating to the forces to which each ground contact member 41, 42, 43, 44 of the landing gear 40 is subjected, namely a piece of information that varies during landing, and at least one measurement device 66 68 for measuring at least one piece of information relating to the pitches of the blades 21, 31 of the rotors 2, 3, namely a piece of information that varies with the pitches of the blades 21, 31.

A measurement device 61 64 for measuring at least one piece of information relating to the forces to which each ground contact member 41, 42, 43, 44 of the landing gear 40 is subjected may be arranged on each undercarriage unit of the landing gear 40 and more precisely on each ground contact member 41, 42, 43, 44. For example, for the rotorcraft 1 shown in FIG. 1, a respective measurement device 61, 62, 63 is arranged on each connecting member 45, 46, 47. For the rotorcraft 1 shown in FIG. 2, two measurement devices 61, 62, 63, 64 are arranged on each skid undercarriage unit. For example, two measurement devices 61, 62, 63, 64 are thus arranged on each cross-member 8, 9, and more precisely one on each connecting member 56, 57, 58, 59 in order to detect and measure the forces to which a front region and a rear region of each skid undercarriage unit 48, 49 are respectively subjected.

Each measurement device 61 64 for measuring a piece of information relating to the forces to which each ground contact member 41, 42, 43, 44 is subjected thus enables a force to which said ground contact member 41, 42, 43, 44 or the corresponding connecting member 45, 46, 47, 56, 57, 58, 59 is subjected to be measured directly, or indeed enables penetration or deformation of each ground contact member 41, 42, 43, 44 or of the corresponding connecting member 45, 46, 47, 56, 57, 58, 59 to be measured. Measuring penetration or deformation of each ground contact member 41, 42, 43, 44 makes it possible to deduce the force to which the ground contact member 41, 42, 43, 44 is subjected, e.g. by means of a correlation table.

A measurement device 66 68 for measuring at least one piece of information relating to the pitches of the blades 21, 31 of the rotors 2, 3 may be arranged on each control device 22, 23, 32 for causing the pitches of the blades 21, 31 of a rotor 2, 3 to vary. For example, a measurement device 66 may be arranged on the collective pitch control stick 22 for controlling the collective pitch of the blades 21 of the lift main rotor 2. For example, a measurement device 67 may be arranged on the cyclic pitch control lever 23 for controlling the cyclic pitch of the blades 21 of the lift main rotor 2. For example, a measurement device 66 may be arranged on the pedals 32 that modify the collective pitch of the blades 31 of the tail auxiliary rotor 3.

In this way, the measurement devices 66 68 measure the positions of each control device 22, 23, 32 for controlling the variation in the pitches of the blades 21, 31 of the rotors 2, 3, which positions are substantially proportional to the real pitch values of said blades 21, 31.

The measurement devices 66 68 for measuring information relating to the pitches of the blades 21, 31 of the rotors 2, 3 may also be arranged in the immediate vicinities of the rotors 2, 3 in order to measure the pitches of said blades 21, 31 directly.

The landing phase for landing a rotorcraft 1 on flat and horizontal ground and on sloping ground is an operation that can be complex. In particular on unprepared or sloping terrain, the landing phase starts with the rotorcraft 1 hovering with an attitude that is substantially horizontal and thus not parallel to the ground on which the rotorcraft 1 is about to land. FIGS. 3 to 6 show the various steps in such a landing phase for landing the rotorcraft 1 on a slope 100.

Figure 3:
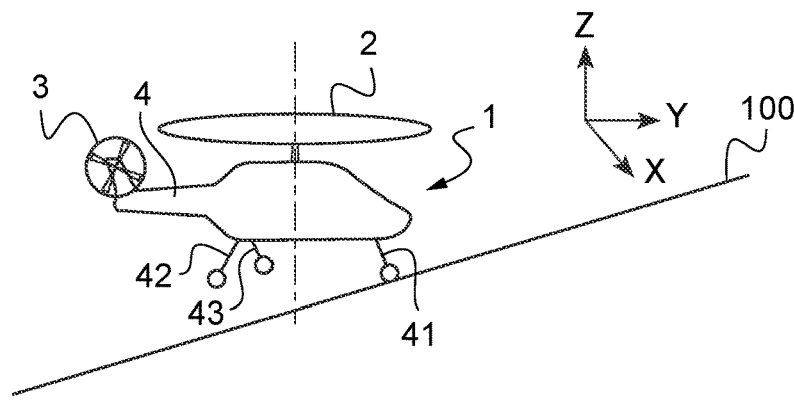
FIGS. 3 to 6 show the steps in landing on sloping ground.

Firstly, after the rotorcraft 1 has been hovering, the pilot causes the rotorcraft 1 to descend in a substantially vertical direction so as to seek to bring at least one undercarriage unit 41 of the rotorcraft 1 into contact with the slope 100, as shown in FIG. 3. To this end, the pilot lowers the pitches of the blades 21 of the lift main rotor 2. For example, the front undercarriage unit 41 of the rotorcraft 1 is the first undercarriage unit to come into contact with the slope, as shown in FIG. 3, although, depending on the operational conditions, another of the undercarriage units 41, 42, 43 may touch the ground first. The tip path plane formed by the free ends or "tips" of the blades 21 of the lift main rotor 2 is substantially horizontal and thus, not parallel to the slope 100. The pieces of information relating to the pitches of the blades 21, 31 of the rotors 2, 3 that are obtained during the first step are very close to the pieces of information corresponding to hovering, and the contribution from the gradient of the slope 100 is not yet passed on to the positions of the control devices 22, 23, 32.

Figure 4:
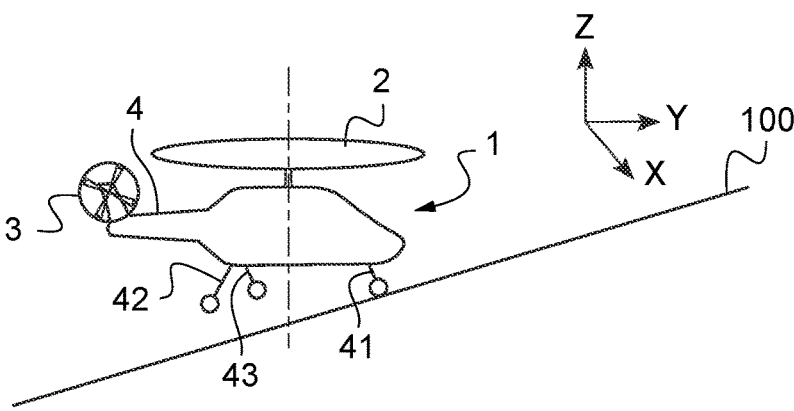

Then, the pilot continues to cause the rotorcraft 1 to descend, still in a substantially vertical direction, as shown in FIG. 4, causing progressive penetration or deformation the front undercarriage unit 41. In this phase, the tip path plane of the lift main rotor 2 remains substantially horizontal to maintain the rotorcraft 1 in balance on the slope.

The pilot or the stabilization assistance provided by the control laws then act on the cyclic pitch lever 23 for controlling the cyclic pitch of the blades 21 of the lift main rotor 2 and, where applicable, on the pedals 32, so as to maintain balance for the rotorcraft 1 and for its rotors 2 and 3. In this phase, a second undercarriage unit 42 can come into contact with the slope 100.

This is the opportune time to store the pieces of information relating to the pitches of the blades 21, 31 of each rotor 2, 3. Indeed, it is necessary to wait for a first wheeled undercarriage unit to penetrate far enough or indeed for two undercarriage units to be in contact with the ground for the pitches of the blades 21, 31 of the rotors 2, 3 that are obtained for maintaining the rotorcraft 1 in balance during the landing to be representative of the balance that is to be found again for the rotorcraft 1 during the takeoff phase. In this example, the means for detecting the reaction forces from the ground on the rotorcraft 1 make it possible to detect this opportune time in order to store the pieces of information relating to the measurements of pitches of the blades 21, 31 of the rotors 2, 3 that are obtained for maintaining the rotorcraft 1 in balance.

In order to finish the landing, the pilot continues to act on the collective pitch control stick 22 for controlling the collective pitch of the blades 21 of the lift main rotor 2 so as to lower it to the full fine pitch position. At the same time, the pilot or a control law recenters both the cyclic pitch control lever 23 for controlling the cyclic pitch of the blades 21 of the lift main rotor 2, and also the pedals 32 for controlling the collective pitch of the blades 31 of the tail auxiliary rotor 3 about positions that are centered respectively for each control axis of the rotorcraft 1, namely a roll axis, a pitch axis, and a yaw axis. Each centered position induces minimal thrust, or indeed zero thrust, exerted by the respective rotor 2,3 about the axes of the rotorcraft 1. These centered positions are commonly referred to as "zero pitch" positions. This makes it possible to position the lift main rotor 2 substantially perpendicular to the rotor mast in order to limit the moments to which the mast is subjected that can cause damage to mechanical parts of the rotorcraft 1.

Figure 6:
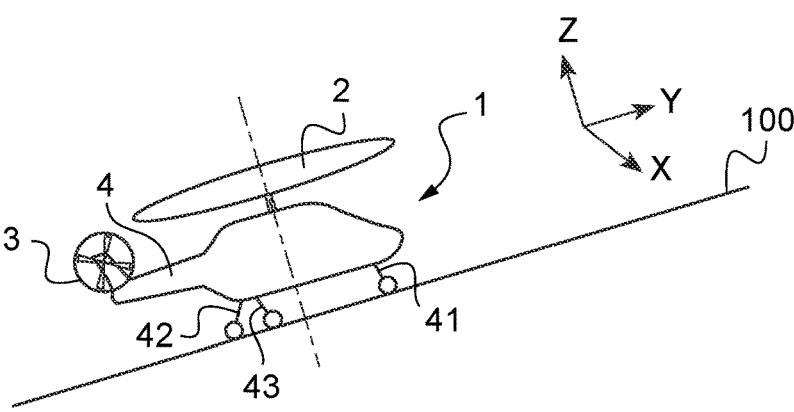

During this phase, the tip path plane of the lift main rotor 2 continues to tilt until it is substantially parallel to the slope 100, as shown in FIG. 6. The third undercarriage unit 43 has then come into contact with the slope 100. The rotorcraft 1 is landed on the slope 100.

These steps of the landing phase for landing on sloping ground are substantially identical for a rotorcraft 1 provided with skid landing gear 40, it being possible for a front or rear region of a skid 48, 49 to come into contact with the slope 100 first.

The rotorcraft 1 does not generally stay for long on sloping ground and takes off again rapidly. The takeoff phase must be performed substantially vertically, i.e. in a manner substantially similar to the landing phase.

Therefore, in order to simplify the work of the pilot and in order to secure safety for the takeoff phase during which the rotorcraft 1 takes off from the sloping ground, the takeoff assistance system 60 is configured to implement a method of providing a rotorcraft 1 with assistance in taking off, which method aims to act as of the start of the takeoff phase to position the blades 21, 31 of the rotors 2, 3 of the rotorcraft 1 in pitch positions that are similar to those used during the landing phase. To this end, the method of providing a rotorcraft 1 with assistance in taking off from a slope includes the following steps.

Firstly, a step of measuring at least one piece of information relating to the forces to which each ground contact member 41, 42, 43, 44 of the landing gear 40 is subjected during a landing phase for landing on the slope 100 makes it possible, by means of the measurement devices 61 64, to measure, directly or indirectly, the forces to which each ground contact member 41, 42, 43, 44 of the landing gear 40 is subjected.

A step of measuring at least one piece of information relating to the pitches of the blades 21, 31 of each rotor 2, 3 during the landing phase for landing the rotorcraft 1 is also performed so as to act, by means of the measurement devices 66 68, to measure, directly or indirectly, the values of the collective and/or cyclic pitches of the blades 21, 31 of the rotors 2, 3 of the rotorcraft 1, e.g. by measuring the positions of the control devices 22, 23, 32 for controlling said pitches.

This step of measuring at least one piece of information relating to the pitches of the blades 21, 31 may be performed continuously or in sampled manner during the landing phase, or indeed at an opportune time during the landing phase. Such an opportune time corresponds, for example, to the time at which a significant increase occurs in a force on a ground contact member 41, 42, 43, 44 in contact with the ground, with that ground contact member 41, 42, 43, 44 being the only one in contact with the ground, as shown in FIG. 4. Such a significant increase is, for example considered to have been reached when a piece of information relating to the forces to which a ground contact member 41, 42, 43, is subjected is greater than a penetration threshold, and the pieces of information relating to the forces to which the other ground contact members 41, 42, 43, 44 are subjected are less than a non-contact threshold, the non-contact threshold being less than the penetration threshold.

Figure 5:
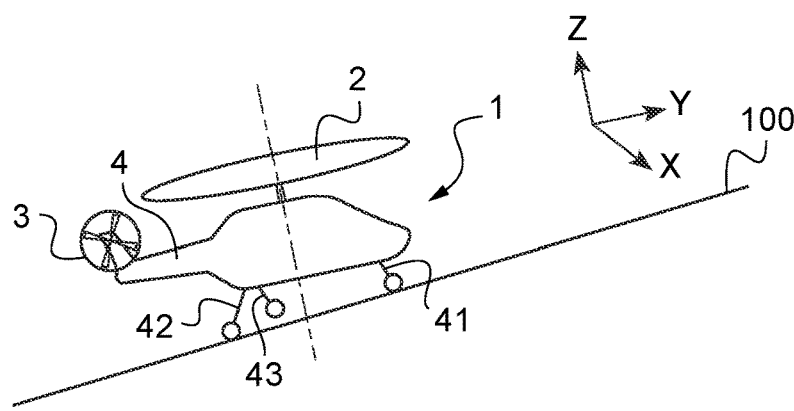

This opportune time may also be the instant at which the second ground contact member comes into contact with the ground as shown in FIG. 5. Two ground contact members 41, 42, 43, 44 are detected as being in contact with the ground when pieces of information relating to the forces to which two ground contact members 41, 42, 43, 44 are subjected are greater than a contact threshold, and a piece of information relating to the forces to which each of the other ground contact members 41, 42, 43, 44 is subjected is less than a non-contact threshold, the non-contact threshold being less than the contact threshold.

Finally, a step of controlling the pitch of the blades 21, 31 of the rotors 2, 3 is performed during the takeoff phase during which the rotorcraft 1 takes off again after landing. During this step of controlling the pitch of the blades 21, 31 of the rotors 2, 3, the measurements taken during the landing phase are applied so as to reduce the workload on the pilot of the rotorcraft 1 and so as to make this takeoff phase safer.

This step of controlling the pitch of the blades 21, 31 of the rotors 2, 3 for a takeoff phase during which the rotorcraft takes off is performed as of detection of the start of the takeoff phase during which the rotorcraft 1 takes off. For example, the start of the takeoff phase may be detected as soon as the pilot acts to increase the collective pitch of the blades 21, 31 of the lift main rotor 2, typically by acting on the collective pitch control stick 22.

The start of the takeoff phase may also be detected as soon as at least one piece of information relating to the collective pitch of the blades 21, 31 of the lift main rotor 2, as measured by means of a measurement device 66 68, is greater than a takeoff threshold.

The method may further include a step of storing the measurements of the piece of information relating to the pitch of the blades 21, 31 of the rotors 2, 3. This storing is performed in a memory of the computer 10 or indeed in a memory connected to the computer 10.

Finally, the method may include an automatic takeoff step performed simultaneously with the automatic control step for automatically controlling the pitches of the blades 21, 31 of the rotors 2, 3 and applying an increasing setpoint to the collective pitch of the blades 21 of the lift main rotor 2 of the rotorcraft 1. The rotorcraft 1 can thus take off automatically and safety from flat ground or, naturally, from sloping ground.

In addition, when the step of measuring at least one piece of information relating to the pitches of the blades 21, 31 may be performed continuously or in sampled manner during the landing phase, the method may also include an automatic takeoff step by applying an increasing setpoint to the collective pitch of the blades 21 of the lift main rotor 2 of the rotorcraft 1, the automatic control step for automatically controlling the pitches of the blades 21, 31 of each rotor 2, 3 applying, successively and in reverse order, commands for controlling the pitches of the blades 21, 31 of the rotors 2, 3 based on the measurements of the pitches of the blades 21, 31 of the rotors 2, 3 that are taken during the landing phase.

Naturally, the present invention may be subjected to numerous variations as to its implementation. Although several implementations are described above, it should readily be understood that it is not conceivable to identify exhaustively all possible implementations. It is naturally possible to envisage replacing any of the means described by equivalent means without going beyond the ambit of the present invention.

What is claimed is:

1. A method of providing a rotorcraft with assistance in taking off, the rotorcraft including:
   a fuselage;
   at least one rotor provided with a plurality of blades and including at least one lift rotor;
   control devices for controlling the pitches of the blades of the rotor(s); and
   landing gear provided with at least three ground contact members connected to the fuselage;
   wherein the method comprises the following steps:
   measuring at least one piece of information relating to the forces to which each ground contact member is subjected during a landing phase;
   measuring at least one piece of information relating to the pitches of the blades of the rotor(s) during the landing phase during which the rotorcraft lands; and
   automatically controlling the pitches of the blades of the rotor(s) during the takeoff phase during which the rotorcraft takes off after the landing as a function of the measurements taken during the landing.

2. The method according to claim 1,
   wherein the piece(s) of information relating to the pitches of the blades of the rotor(s) include(s) a measurement of the position of at least one control device) for controlling the pitches of the blades of the rotor(s) or else a direct measurement of the pitches of the blades of the rotor(s) taken at the rotor(s).

3. The method according to claim 1,
   wherein, when the rotorcraft has at least three lift rotors, the pitch of the blades of which is variable collectively only, the piece(s) of information relating to the pitches of the blades of the rotor(s) include(s) the collective pitch of the blades of each lift rotor and/or a speed of rotation of each lift rotor and/or the orientation of control surfaces arranged in the airflow sweeping over at least one lift rotor.

4. The method according to claim 1,
   wherein, when the rotorcraft has at least one lift rotor, the pitch of the blades of which is variable both collectively and cyclically, the piece(s) of information relating to the pitches of the blades of the rotor(s) Include(s) the collective pitch and the cyclic pitch of the blades of each lift rotor.

5. The method according to claim 1,
   wherein, when the rotorcraft has at least one auxiliary rotor, the pitch of the blades of which is variable collectively only, the piece(s) of information relating to the pitches of the blades of the rotor(s) include(s) the collective pitch of the blades of each auxiliary rotor.

6. The method according to claim 1,
   wherein the step of measuring the piece(s) of information relating to the pitches of the blades is performed continuously or in sampled manner during the landing phase, each measurement of the piece(s) of information relating to the pitches of the blades being associated with the measurements of the piece(s) of information relating to the forces to which each ground contact member is subjected.

7. The method according to claim 1,
   wherein the automatic control step for automatically controlling the pitches of the blades of the rotor(s) is performed by using the piece(s) of information relating to the pitches of the blades of the rotor(s) as measured at an opportune time during the landing phase, the opportune time being reached either when a single ground contact member is in contact with the ground and a significant increase in a force exerted on the ground contact member in contact with the ground is detected, or when two ground contact members are detected as being in contact with the ground.

8. The method according to claim 1,
   wherein the step of measuring the piece(s) of information relating to the pitches of the blades is performed either when a single ground contact member is in contact with the ground and a significant increase in a force exerted on the ground contact member in contact with the ground is detected, or when two ground contact members are detected as being in contact with the ground.

9. The method according to claim 7,
   wherein a single ground contact member is in contact with the ground and a significant increase in a force on the ground contact member in contact with the ground is detected when a piece of information relating to the forces to which a ground contact member is subjected is greater than a penetration threshold and pieces of information relating to the forces to which the other ground contact members are subjected are less than a non-contact threshold, the non-contact threshold being less than the penetration threshold.

10. The method according to claim 7,
    wherein two ground contact members are detected as being in contact with the ground when pieces of information relating to the forces to which two ground contact members are subjected are greater than a contact threshold, and a piece of information relating to the forces to which the other ground contact member(s) is/are subjected is less than a non-contact threshold, the non-contact threshold being less than the contact threshold.

11. The method according to claim 1,
    wherein the automatic control step for automatically controlling the pitches of the blades of the rotor(s) for a takeoff phase during which the rotorcraft takes off is performed as soon as a start of the takeoff phase during which the rotorcraft (1) takes off is detected.

12. The method according to claim 11,
    wherein the start of the phase of the takeoff is detected as soon as at least one piece of information relating to the collective pitch of the blades of the lift rotor(s) is greater than a takeoff threshold.

13. The method according to claim 1,
    wherein the step of measuring at least one piece of information relating to the forces to which each ground contact member of the landing gear is subjected during the landing phase includes a measurement of a force to which each ground contact member is subjected or else a measurement of a penetration or a deformation of each ground contact member.

14. The method according to claim 1,
    wherein when the landing gear comprises at least three wheeled undercarriage units, each of which is provided with a ground contact member, each ground contact member comprises at least one wheel and at least one connecting member connecting the wheel(s) to the fuselage, when the landing gear comprises at least three ski undercarriage units, each of which is provided with a ground contact member, each ground contact member comprises at least one ski and at least one connecting member connecting the ski(s) to the fuselage, and when the landing gear comprises two skid undercarriage units, each of which is provided with two ground contact members, each ground contact member comprises a portion of a skid and a connecting member connecting the skid to the fuselage.

15. The method according to claim 1,
wherein with the piece(s) of information relating to the pitches of the blades of each rotor comprising a direct measurement of the pitches of the blades, which measurement is taken at each rotor during the landing phase, when a piloting assistance law for automatically stabilizing the rotorcraft acts dynamically on the pitches of the blades of each rotor, a contribution from the piloting assistance law for automatic stabilization to the pitches of the blades of each rotor is subtracted from the piece of information relating to the pitches of the blades of each rotor as measured.

16. The method according to claim 1,
wherein when a pilot of the rotorcraft lowers a collective pitch control stick for controlling the collective pitch of the blades of each lift rotor towards a full fine pitch position, a recentering phase for recentering the pitches of the blades of each rotor towards a centered position is performed as soon as the information relating to the collective pitch of the blades of each lift rotor is less than a recentering threshold and as soon as the information relating to the forces to which each ground contact member is subjected is greater than an actual landing threshold representing the fact that the rotorcraft is on the ground.

17. The method according to claim 16,
wherein during a landing, if the piece of information relating to the collective pitch of the blades of each lift rotor is measured as being less than a recentering threshold, with the recentering phase having been performed, and then if the piece of information relating to the collective pitch of the blades of each lift rotor increases without having been less than a takeoff threshold, the automatic control step for automatically controlling the pitches of the blades of each rotor is performed as for a takeoff as soon as the piece of information relating to the collective pitch of the blades of each lift rotor is measured as being greater than a specific threshold.

18. The method according to claim 1,
wherein during a takeoff, if the information relating to the collective pitch of the blades of each lift rotor is measured as being greater than a takeoff threshold, and then is reduced without having been greater than a recentering threshold greater than the takeoff threshold, a phase of recentering each rotor towards a centered position is performed when the piece of information relating to the collective pitch of the blades of each lift rotor is measured as being less than a limit threshold.

19. The method according to claim 1,
wherein, during the automatic control step for automatically controlling the pitches of the blades of each rotor, any action by a pilot on a control device for controlling the cyclic pitch of the blades of each lift rotor and/or the pitch of the blades of an auxiliary rotor, performed at the time at which the automatic control step takes place, is subtracted from a full command of a control law for piloting the rotorcraft, the full command of the control law being constituted by the automatic control step for automatically controlling the pitches of the blades of each rotor during a takeoff phase during which the rotorcraft takes off, or by a recentering phase for recentering the pitches of the blades of each rotor during a landing phase during which the rotorcraft lands.

20. The method according to claim 1,
wherein, during the automatic control step for automatically controlling the pitches of the blades of each rotor, any action by a pilot on a control device for controlling the cyclic pitch of the blades of each lift rotor and/or the pitch of the blades of an auxiliary rotor, performed after application of the automatic control step, is added to a full command of the automatic control step for automatically controlling the pitches of the blades Of each rotor, the full command of the control law being constituted by the automatic control step for automatically controlling the pitches of the blades of each rotor during a takeoff phase during which the rotorcraft takes off, or by a recentering phase for recentering the pitches of the blades of each rotor during a landing phase during which the rotorcraft lands.

21. The method according to claim 1,
wherein the method further comprises a step of storing the piece(s) of information relating to the pitches of the blades of the rotor(s).

22. The method according to claim 1,
wherein, for a takeoff performed after a taxiing operation has been performed on the ground after landing on a slope with a gradient of less than or equal to 3°, with a piece of information relating to the collective pitch of the blades of each lift rotor less than a takeoff threshold, the automatic control step for automatically controlling the pitches of the blades of each rotor is performed towards a predetermined position of the blades of each rotor by replacing the measurements performed during the landing, the predetermined position of the blades of each rotor corresponding to balance for the rotorcraft when hovering, without any wind and with a predetermined weight of the rotorcraft with predetermined centering of the weights.

23. The method according to claim 1,
wherein with the rotorcraft having at least one lift rotor and at least one auxiliary rotor, during the automatic control step for automatically controlling the pitches of the blades of the rotor(s), a pilot of the rotorcraft controls the collective pitch of the blades of the lift rotor(s), the cyclic pitch of the blades of the lift rotor(s) and the pitch of the blades of at least one auxiliary rotor being controlled automatically.

24. The method according to claim 1,
wherein the method further comprises an automatic takeoff step performed by applying an increasing setpoint to the collective pitch of the blades of each lift rotor, the automatic control step for automatically controlling the pitches of the blades of each rotor being performed simultaneously.

25. The method according to claim 1,
wherein the method further comprises an automatic takeoff step performed by applying, successively and in reverse order, the automatic commands for controlling the pitches of the blades of each rotor as a function of the measurements of the pitches of the blades of each rotor taken during the landing phase.

26. A system for providing a rotorcraft with assistance in taking off from a slope, the rotorcraft including a fuselage as well as at least one rotor provided with a plurality of blades and including at least one lift rotor, the rotorcraft further including control devices for controlling the pitches of the blades of the rotor(s), the rotorcraft further including landing gear provided with at least three ground contact members, the system for providing a rotorcraft with assistance in taking off comprising at least one computer), the system for providing a rotorcraft with assistance in taking off further comprising at least one measurement device) for measuring at least one piece of information relating to the forces to which each ground contact member of the landing gear is subjected, the system for providing a rotorcraft with assistance in taking off further comprising at least one measurement device for measuring at least one piece of information relating to the pitches of the blades of the rotor(s), wherein the system for providing assistance in taking off is configured to implement the method according to claim 1.

27. A rotorcraft including:

a fuselage;

at least one rotor provided with a plurality of blades and including at least one lift rotor;

control devices for controlling the pitches of the blades of the rotor(s);

landing gear provided with at least three ground contact members; and the system for providing the rotorcraft with assistance in taking off from a slope;

wherein the system for providing assistance in taking off is the system according to claim 26.

* * * * *